United States Patent
Schirle

(10) Patent No.: US 6,621,653 B1
(45) Date of Patent: Sep. 16, 2003

(54) SECONDARY ACTUATOR SYSTEM FOR MODE COMPENSATION

(75) Inventor: Neal Bertram Schirle, Morgan Hill, CA (US)

(73) Assignee: Hitachi Global Storage Technologies Netherlands B.V., Amsterdam (NL)

(*) Notice: Subject to any disclaimer, the term of this patent is extended or adjusted under 35 U.S.C. 154(b) by 373 days.

(21) Appl. No.: 09/590,891

(22) Filed: Jun. 9, 2000

(51) Int. Cl.⁷ .............................................. G11B 5/596
(52) U.S. Cl. .................................................. 360/78.12
(58) Field of Search ........................ 360/75, 244.2, 360/244.4, 78.12; 369/13

(56) References Cited

U.S. PATENT DOCUMENTS

| | | | | |
|---|---|---|---|---|
| 3,924,268 | A | 12/1975 | McIntosh et al. | 360/78 |
| 4,736,353 | A | 4/1988 | Kasai et al. | 369/32 |
| 4,858,040 | A | 8/1989 | Hazebrouck | 360/78.05 |
| 4,866,687 | A | 9/1989 | Kasai et al. | 369/32 |
| 5,060,210 | A | 10/1991 | Fennema et al. | 369/32 |
| 5,220,546 | A | 6/1993 | Fennema | 369/32 |
| 5,305,294 | A * | 4/1994 | Kime et al. | 369/13.17 |
| 5,402,402 | A | 3/1995 | Kagami et al. | 369/44.28 |
| 5,459,383 | A | 10/1995 | Sidman et al. | 318/611 |
| 5,521,778 | A | 5/1996 | Boutaghou et al. | 360/106 |
| 5,568,003 | A | 10/1996 | Deck | 310/316 |
| 5,623,461 | A | 4/1997 | Sohmuta | 369/32 |
| 5,764,444 | A * | 6/1998 | Imamura et al. | 360/294.4 |
| 5,805,375 | A | 9/1998 | Fan et al. | 360/78.12 |
| 5,862,015 | A * | 1/1999 | Evans et al. | 360/244.1 |
| 5,920,441 | A | 7/1999 | Cunningham et al. | 360/78.05 |
| 6,002,549 | A * | 12/1999 | Berman et al. | 360/294.4 |
| 6,064,540 | A * | 5/2000 | Huang et al. | 318/561 |
| 6,100,623 | A * | 8/2000 | Huang et al. | 310/316.01 |
| 6,101,058 | A * | 8/2000 | Morris | 360/69 |
| 6,166,874 | A * | 12/2000 | Kim | 360/60 |
| 6,310,746 | B1 * | 10/2001 | Hawwa et al. | 360/244.2 |

OTHER PUBLICATIONS

Kirtley, J. R., et al. "Active vibration damping of scanning tunneling microscope", IBM Technical Disclosure Bulletin, V 31, No. 2, pp. 426–429, Jul. 1988.

Near, C. D., "Piezoelectric actuator technology", SPIE International Society for Optical Engineering, V 2717, pp. 246–258, 1993.

Zhi–Min, Y., et al. "Controller design criteria for the dual–stage disk actuator system", Proc. SPIE–International Society for Optical Engineering (USA), V 2101, No. 1, pp. 305–308, 1993.

Chiang, W. W., "Piezoelectric modal sensor/actuator devices for DASD active damping vibration control", IBM Technical Disclosure Bulletin, V 34, No. 4B, pp. 53–54, Sep. 1991.

(List continued on next page.)

Primary Examiner—David Hudspeth
Assistant Examiner—K. Wong
(74) Attorney, Agent, or Firm—Randall J. Bluestone; Ron Feece

(57) ABSTRACT

A secondary servo actuator system for use in disk drives comprising a controller and two PZT transducers mounted on each suspension load beam in an arm assembly. When a seek operation is initiated the acceleration of the arms generates vibration modes. The PZT transducers on a suspension adjacent to the target head/suspension sense the vibration motion and provide output signals to the controller. The controller filters the signal and generates a control signal for the PZTs mounted on the target arm/suspension. The deformation of the PZTs in turn rotates the arm load beam and thereby adjusts the position of the target head to compensate for arm motion caused by the vibration modes. The secondary actuator system can be used during the deceleration trajectory of a target head to suppress lower order arm sway frequencies. The milliactuator of the target head can also be used to sense the phase and amplitude of the dominant arm sway mode to enable the deceleration control signal to be applied with a phase relation that suppresses the arm sway mode that was excited upon application of seek servo actuator control.

22 Claims, 5 Drawing Sheets

OTHER PUBLICATIONS

Guo, L. et al. "Dual–stage actuator servo control for high density disk drives", Proceedings of the 1999 IEEE/ASME International Conference on Advanced Intelligent Mechatronics, pp. 132–137, 19–23 Sep. 19–23, 1999.

Guo, W., et al. "Dual stage actuators for high density rotating memory devices" IEEE Trans. Magn. (USA), V 34, No. 2, pp. 450–455, Mar. 1998.

Imaino, W. I., et al. "Disk drive with mode canceling actuator", Filed Mar. 18, 1999, Ser. No. 09/272,941.

Janocha H., et al., "Principle of smart piezoactuators", Actuator 96, 5th International Conference on New Actuators, pp. 148–151, Jun. 26–28, 1996, Breman, Germany.

* cited by examiner

SECONDARY ACTUATOR SYSTEM FOR MODE COMPENSATION

BACKGROUND OF THE INVENTION

1. Field of the Invention

The present invention relates to a system for read/write head servo control in data storage devices, and more particularly to a secondary actuator system.

2. Description of Related Art

Numerous technologies have been developed to improve the accuracy of read/write head positioning systems of information storage devices, such as disk drives, as part of the ongoing process of increasing recording density. At the high recording densities that have been achieved, the sway mode vibration of arms supporting the heads that are generated in seek operations are one of the limiting factors on the servo system accuracy. High-bandwidth servo actuators are crucial to achieving large track densities in rotating disk magnetic storage devices. Approaches to achieving higher servo actuator bandwidth include the use of high specific stiffness materials such as AlBC for making the arms, secondary actuators, and active/passive damping techniques.

The use of dual-stage actuation systems having a primary actuator, e.g., a Voice Coil Motor (VCM), for executing large movements and a secondary actuator, e.g., a piezoelectric element (PZT), for fine-tuning and tracking is well-known in the art. Small PZT milliactuators have higher vibrational modes than the VCM due to scaling. Descriptions of such systems are found in scientific and patent literature. Some representative references include Ahi-Min Y., et al., "Controller Design Criteria for the Dual-Stage Disk Actuator System", Proc. SPIE—International Society for Optical Engineering (USA), Vol. 2101, No. 1,1993, pp. 305–8 and Guo, W., et al., "Dual Stage Actuators for High Density Rotating Memory Devices", IEEE Trans. Magn. (USA), Vol. 34, No. 2, pt. Mar. 1, 1998, pp. 450–5.

A PZT transducer is suitable for actuation purposes and is generally controlled by applying a suitable control voltage. In response, the PZT changes its physical dimensions causing a deflection or displacement of the PZT element and displacement of any other mechanical element to which the PZT is rigidly or semi rigidly mounted. Additionally, certain PZTs such as piezoelectric ceramics are inexpensive and combine simultaneously actuation and sensing capabilities. In particular, such "smart" PZTs or self-sensing PZTs react to a change in mechanical load by changing their electrical properties, including stored charge, which can be sensed by proper electrical circuitry. They can thus sense the deformation of the PZT or deflection of the arm while at the same time performing actuator functions. Self-sensing PZTs are described in prior art references such as Janocha H., et al. "Principle of Smart Piezoactuators", Actuator 96, 5th International Conference on New Actuators", Jun. 26–28, 1996, Bremen, Germany, and Near C. D., "Piezoelectric Actuator Technology", SPIE International society for Optical Engineering, Vol. 2717, April 1998, pp. 246–58. Additional prior art references teach the use of PZTs as devices for active damping of vibrating structures or arms. Publications describing these applications of PZTs include: "Piezoelectric Modal Sensor/Actuator Devices for DASD Active Damping Vibration Control", W. W. Chiang, et al., IBM Technical Disclosure Bulletin, Vol. 34, No. 4B, September, 1991, pp. 53–4 and "Active Vibration Damping of Scanning Tunneling Microscope", J. R. Kirtley, et al., IBM Technical Disclosure Bulletin, Vol. 31, No. Jul. 2, 1988, pp. 426–9.

A PZT element used as a milliactuator for deflection control as well as sensing has to be compensated for external influences of temperature, moisture and any electrical fields. Lack of proper compensation of the milliactuator will result in inferior sensing performance or even make it impossible to separate the driving signal causing the deformation from the self-sensing signal. Only when the self-sensed signal is accurate can it be used for compensating the arm assembly, e.g., compensating for vibrational modes. Dual-stage actuation systems are further described in "Dual Stage Actuator Servo Control for High Density Disk Drives", L. Guo, et al., Proceedings of the 1999 IEEE/ASME International Conference on Advanced Intelligent Mechatronics, Sep. 19–23, 1999.

Secondary actuator systems that use the same element as both an actuator and a sensor generally require complicated electronics to multiplex the actuation and sensor signals. Self-sensing milliactuator systems are described in co-pending U.S. patent application Ser. No. 09/139,541 "Piezoelectric Actuator for Control and Displacement Sensing," Fu-Ying Huang et al., as well U.S. patent application Ser. No. 09/272,941 "Disk Drive with Mode Canceling Actuator," Imaino et al. both of these patent applications are assigned to the assignee of the present invention, and are hereby incorporated by reference herein.

A secondary actuator system is also described in U.S. Pat. No. 5,459,383, "Robust Active Damping Control System," Sidman et al. This patent describes a secondary actuator system where the motion sensor is mounted on or very near the actuator motor. Placing the motion sensor near the actuator motor limits the vibration modes that the sensor will detect and therefore the vibration modes that can be compensated by the secondary actuator system.

In view of the foregoing, it is apparent that there is a need for an improved secondary actuator system to overcome the above and other problems and limitations of conventional systems.

SUMMARY OF THE INVENTION

It is an object of the present invention to provide a highly accurate vibrational mode canceling secondary actuator system that compensates for in-plane vibration modes of rotary actuator arms, and overcomes the problems of the prior art.

In summary, the present invention is a secondary servo actuator system for use in storage devices, such as disk drives. In one embodiment, two PZT transducers are mounted on each suspension load beam in an arm assembly. When a seek operation is initiated the acceleration of the arms generates vibration modes. The PZT transducers on an arm adjacent to the target arm sense the vibration motion and provide output signals to a controller. The controller filters the signal and generates a control signal for the PZTs mounted on the target arm. The deformation of the PZTs in turn bends in plane (or rotates) the arm load beam and thereby adjusts the position of the target head to compensate for arm motion caused by vibration modes. Mounting the PZT transducers on the load beam or between the load beam and arm, provides enhanced sensing capabilities compared to sensors mounted farther away from the read/write head. Using one milliactuator to sense motion and a second milliactuator to compensate for the motion avoids the limitations and complicated electronics associated with distinguishing sensed motion from the driving signal deforming the PZT.

The present invention secondary actuator system can be used during servo control about a desired deceleration trajectory of a target head to suppress lower order arm sway frequencies. The milliactuator of the target head can also be used to sense the phase and amplitude of the dominant arm sway mode to enable the deceleration control signal to be applied with a phase relation that suppresses the arm sway mode that was excited upon application of seek servo actuator control. Furthermore, milliactuators on the arms at the top and bottom of the arm assembly can be used to determine the degree of actuator assembly tilt during a seek operation. The degree of tilt can be used as a pass/fail criteria to control the radial stiffness axial asymmetry of the system which can be compromised due to pivot bearing assembly variance.

In another embodiment of the present invention the milliactuators are mounted on a flex circuit of an integrated lead suspension.

DESCRIPTION OF THE DRAWINGS

Additional objects and features of the invention will be more readily apparent from the following detailed description and appended claims when taken in conjunction with the drawings, in which:

DETAILED DESCRIPTION OF THE PREFERRED EMBODIMENTS

Figure 1:
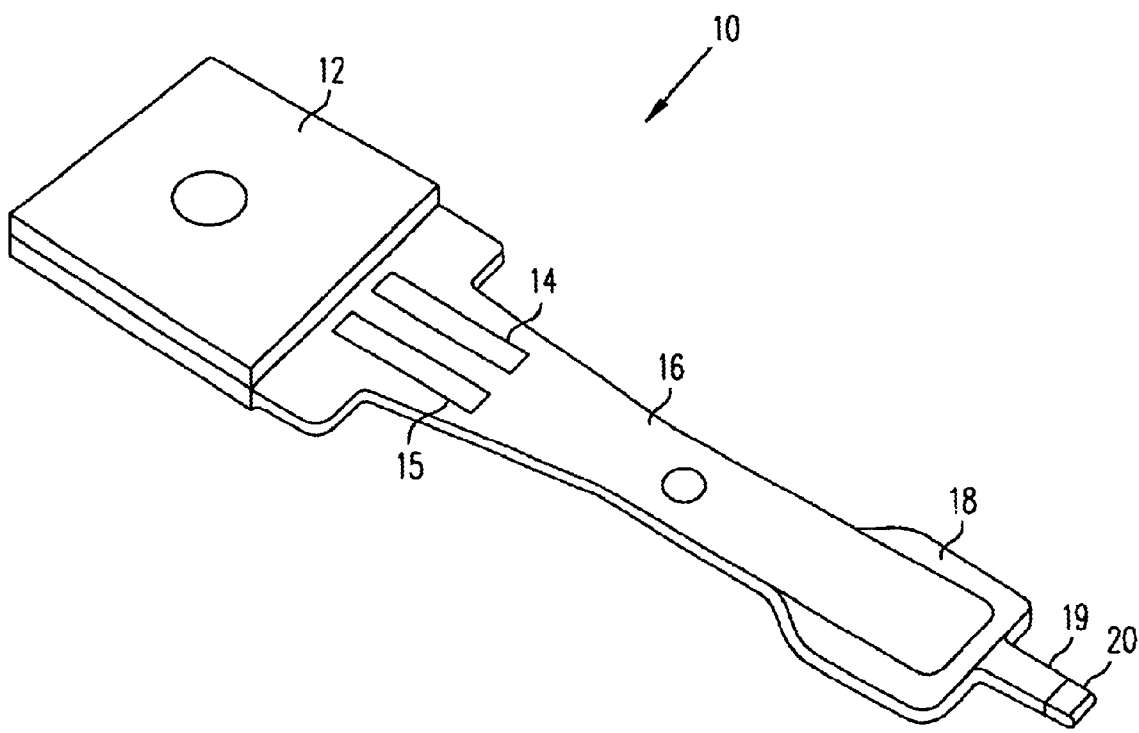
FIG. 1 illustrates a disk drive arm suspension with a milliactuator according to an embodiment of the present invention.

FIG. 1 illustrates a diagram of a disk drive arm suspension 10 according to an embodiment of the present invention. The suspension comprises: mount plate 12, load beam 16, secondary actuator (transducer) elements 14 and 15, flexure 18, slider 19 and read/write head 20. Mount plate 12 can be square or rectangular, and includes a hole and a spud (not shown) which is used to swage the mount plate of the suspension arm to the arm tip. Load beam 16 comprises a long thin piece of steel and is welded to the mount plate. Load beam 16 provides compliance in the vertical plane at the tip where the head/flexure is mounted but is rigid in-plane to resist longitudinal and translation forces. Secondary actuator (milliactuator) elements 14 and 15 are mounted at the base of load beam 16, adjacent to mount plate 12. They are mounted with an adhesive, although other techniques of incorporating the milliactuator elements can be used including using brackets. In a preferred embodiment milliactuator elements 14 and 15 are piezoelectric (PZT) elements. Flexure 18 comprises a thinner piece of steel than the load beam, and is welded to the tip of the load beam. The flexure provides low pitch and roll stiffness and thus allows the slider to gimbal about a point near the end of the load beam, typically a small cold formed dimple. Instead of steel, the flexure may also be made from copper/polyimide as in the case of integrated lead suspensions ("ILS"), as is well known by those of ordinary skill in the art. Slider 19 is bonded to flexure 18. Head 20 is a thin film sensor and write coil. Head 20 is deposited on one end of slider 19 using a photolithographic process.

Figure 2:
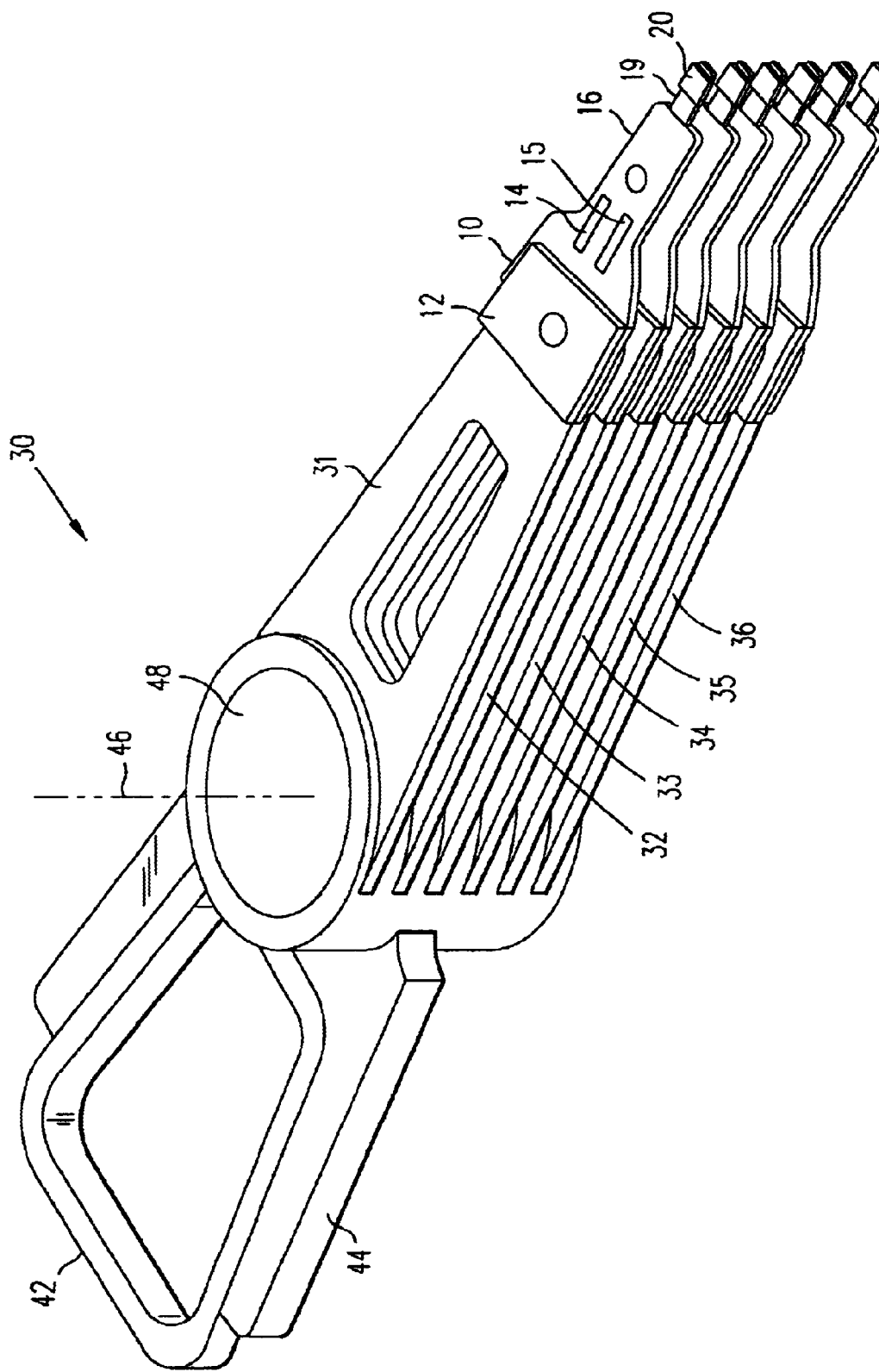
FIG. 2 illustrates an arm assembly that uses two PZT elements per load beam on each of the arms.

FIG. 2 illustrates an arm assembly 30 that uses two milliactuators 14, 15 per load beam 16 on each of the arms 31–36. A Voice Coil Motor (VCM) coil 42 mounted in a cradle 44 is provided for rotating arms 31–36 about a central axis 46 on bearing 48. This type of primary actuation system is well known by those of ordinary skill in the art. Appropriate electrical connections (not shown) are made to each of the milliactuators 14, 15.

In operation, when the disk drive servo controller receives a request to access a track on the disk, a large current, approximating a step function, is provided to VCM coil 42 to move the head to the target track. The resulting rapid acceleration of the arm assembly generates vibration modes in the actuator and arm assembly, including a fundamental mode referred to as the Butterfly mode. The Butterfly mode is the primary mode of a rotary actuator in which bending is about the pivot location and in-plane with respect to the rotary actuator rotation angle. From the top view of the coil/arm assembly, the coil and arms are oscillating together, in-phase, thus moving somewhat like the wings of a Butterfly moving up and down together. The Butterfly mode causes additional phase loss in the servo controller and thus further compromises servo stability especially if arm sway mode frequencies are not sufficiently higher than the Butterfly mode frequency. Army sway mode oscillations generally continue after the head reaches the target track and therefore adversely impact settle time and track misregistration ("TMR").

In systems, such as arm assembly 30, where a single actuator drives multiple arms, a seek operation may excite vibrations in the arms 31–36 that form one of several patterns. For example, a vibration mode where the top end arm 31 and bottom end arm 36 of the stack vibrate in phase and the arms there between vibrate out of phase can be referred to as a "C" mode based on the pattern formed by the relative position of the ends of the arms. Similarly, in a vibration mode where adjacent arms vibrate out of phase can be referred to as an "M" mode. Each of these modes move within the same general frequency range, however, each mode tends to move within a different localized frequency range within that general range.

The present invention milliactuator can be used during the servo control on a desired deceleration trajectory of a target head to suppress lower order arm sway frequencies. In this application, bending modes (out of plane with respect to the recording media disk) that are normally only very lightly coupled to TMR may be a large noise source and should be filtered out. The milliactuator of the target head can also be used to sense the phase and amplitude of the dominant arm sway mode so that the start of the deceleration control signal is applied with a phase relation that suppresses the arm sway mode that was excited upon application of acceleration control.

In yet another feature of the present invention, milliactuators on the arms at the top and bottom of the arm assembly can be used to determine the degree of tilt during a seek operation. The degree of tilt can be used as a pass/fail criteria to control the radial stiffness axial asymmetry of the system which can be compromised due to pivot bearing assembly variance.

Simplifying the actuator structure by reducing the number of arms to two or less eliminates the "M" and "C" family of modes because there are not enough multiples of arms to create an "M" mode and for the case of two arms the end arm in-plane in phase "C" mode converges with a Butterfly like mode. Such simplified actuator coil/comb geometry is well suited for the present invention servo compensation system.

Figure 3:
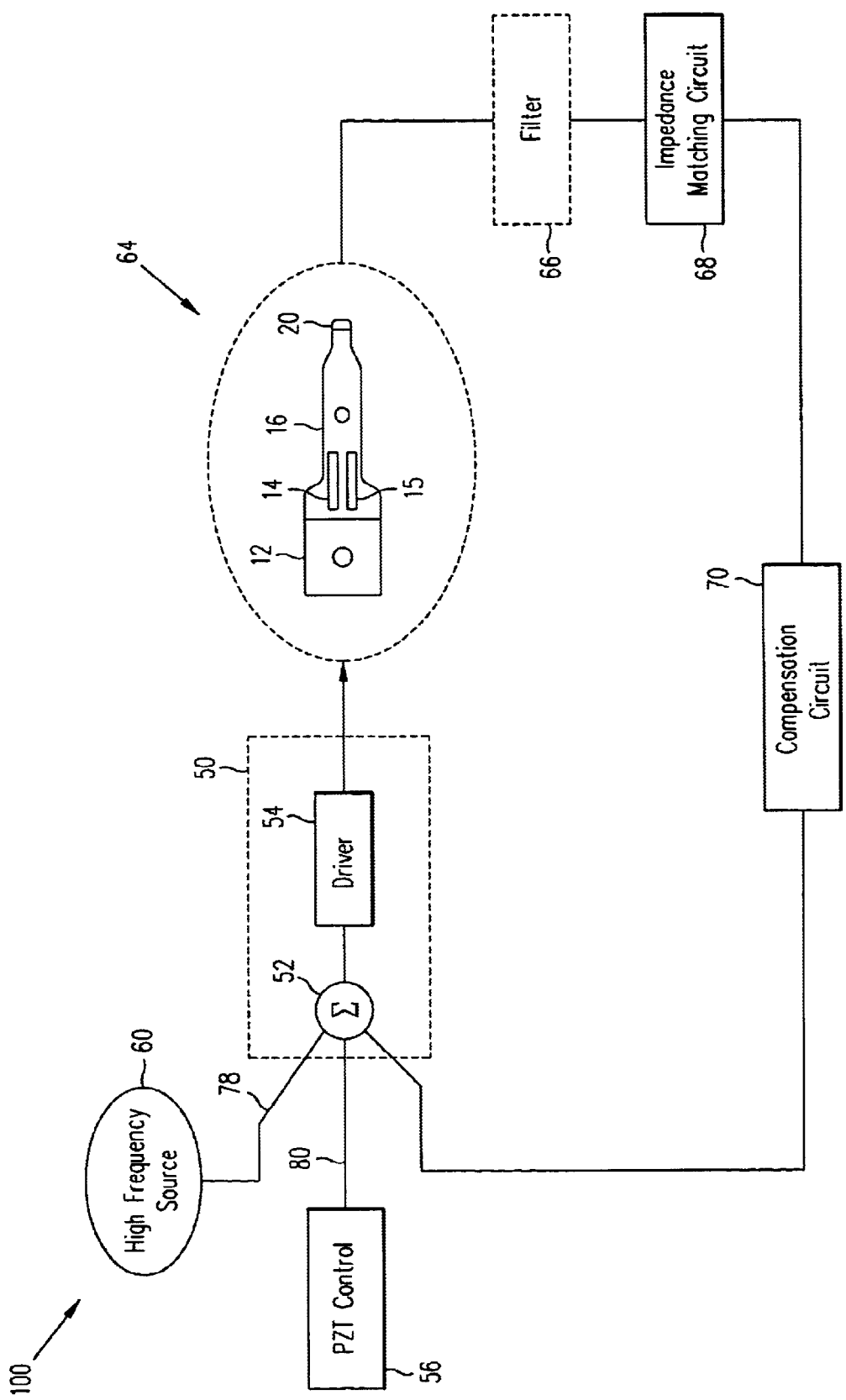
FIG. 3 illustrates a block diagram of a controller for a milliactuator system according to one embodiment of the present invention.

FIG. 3 illustrates a block diagram of a controller 100 for a milliactuator system according to one embodiment of the present invention. A driving stage 50 comprising a summing stage 52 and a voltage driver 54 is connected to PZTs 14, 15 on load beam 16 (FIG. 1). The input of driving stage 50 or summing stage 52 is connected to a high-frequency source 60, a PZT controller 56 and a compensation circuit 70. The output of summing stage 52 is connected to the input of driver 54.

In one embodiment outputs of PZTs 14, 15 are coupled to a filter 66. Filter 66 is an optional element. Filter 66 can be used to determine what mode is compensated for. The frequency ranges of the different arm vibration modes can be determined empirically or by modeling the arm assembly. Filter 66 can then provide a bandpass filter function so that the signals generated by the selected mode will be coupled to impedance matching circuit 68, and the signals from the other modes will be filtered out. The output of impedance matching circuit 68 is coupled to compensation circuit 70. The output of compensation circuit 70 is coupled to summing stage 52.

In operation, the rapid acceleration of arm assembly 30 (FIG. 2) in a seek operation typically generates several vibration modes, including the Butterfly mode and arm sway modes as described above. Filter 66 filters out the vibration modes outside of the frequency range of a predetermined arm sway mode. In one embodiment, filter 66 is a notch filter. For example, for rotary actuator disk drives with at least for 84 mm diameter disks, a typical "Butterfly" mode frequency range is 3 kHz to 4 kHz. For rotary actuators of HDDs of smaller diameter and fewer disks the Butterfly mode frequency can be higher.

The output of filter 66 is coupled to impedance matching circuit 68. Impedance matching circuit 68 is a transformer which steps down the impedance magnitude of the transducer to more closely match impedance levels of compensation circuit 70. The piezoelectric material produces a charge proportional to its applied stress. The charge is sensed as a voltage but at very high resistance, thereby generating very low current and relatively high voltage. Impedance matching circuit 68 transforms that signal to a range similar to the range of compensation circuit 70 so as to more efficiently transmit the signal.

Compensation circuit 70 uses the filtered motion sensor signal to generate a compensation signal which is coupled to summer 52. The summer 52 output is coupled to driver 54, so as to generate a control signal for the PZT transducers to compensate for the measured in-plane arm motion. In one embodiment, compensation circuit 70 uses a model of the PZT sensors comprising a frequency response function to compensate for any nonlinearities of the sensor output.

To drive the PZTs, high frequency source 60 delivers a high frequency excitation 78 to driving stage 50. The frequency of the excitation is sufficiently high above the resonant modes of arm assembly 30 to avoid affecting the arm assembly. PZT control 56 provides a control signal 80 for actuating PZT transducers 14, 15. Excitation 78 and control signal 80 are combined by summing stage 52 and applied to PZT transducers 14, 15 by driver 54. The amplitude of excitation 78 is chosen such that the sum of control signal 80 and excitation 78 does not cause saturation or nonlinear behavior of the stages of arm assembly 30, including suspension 10 in particular.

Figure 4:
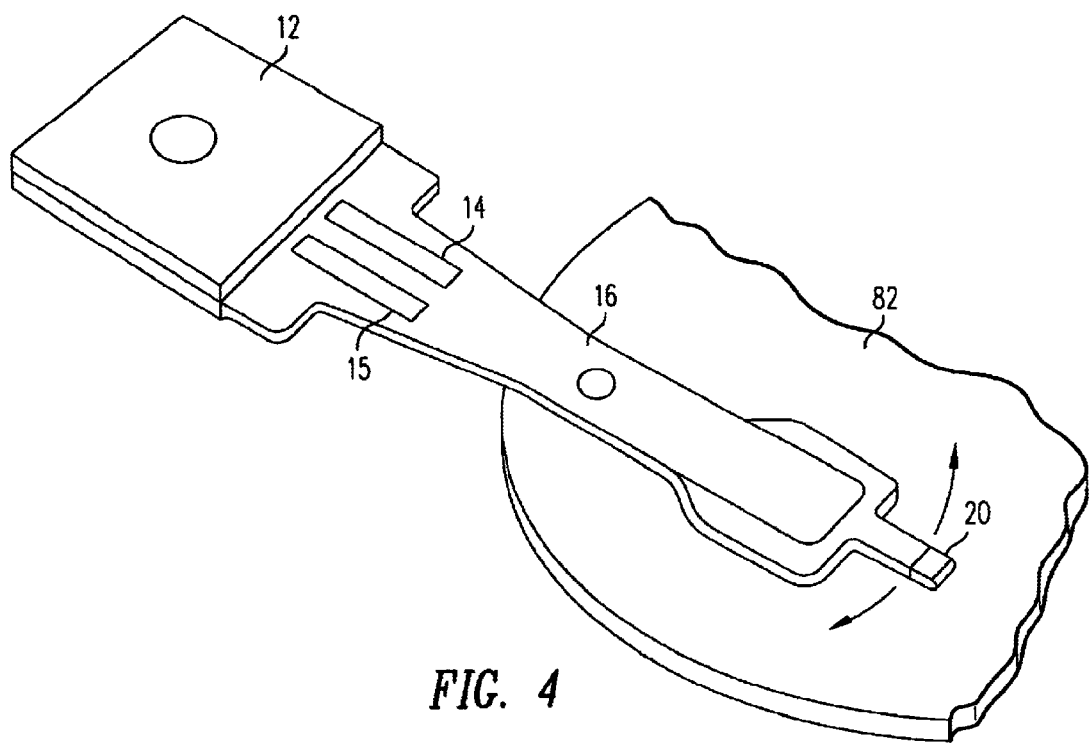
FIG. 4 illustrates motion over a storage media of a suspension with a milliactuator implementation according to one embodiment of the present invention.

In one embodiment of the present invention a pair of PZTs are used to detect the Butterfly mode vibration, and provide an output signal to secondary actuator controller 100 shown in FIG. 3. PZTs on an adjacent arm or another correlated arm are used as sensors to determine the motion of the active arm. To accurately determine the position of the active arm, based on the input from sensors on an adjacent arm, this embodiment determines the dominant mode associated with each type of excitation source. For example, a seek operation where the end arm has the target read/write head will have settle vibration that is effected by the "C" mode (if the seek frequency and energy content is sufficient to excite the C mode vibration). For example, referring to FIG. 2 for a seek operation with arm 31, the PZT transducers on opposite arm 36 sense the motion of the arm and provide corresponding output signals to secondary actuator controller 100 (FIG. 3). Controller 100 generates control signal 80 which deforms PZTs 14, 15. The deformation of the PZTs in turn rotates load beam 16 and thereby adjusts the position of head 20 to compensate for motion of arm 31 caused by vibration modes. FIG. 4 illustrates the resulting displacement of head 20 over a storage medium 82; in this case a rotating disk. PZT transducers 14, 15 thereby help to maintain the position of head 20 over the target track so as to improve settle time and track misregistration (TMR). Using a pair of PZTs to provide secondary actuation, and a mode sensing pair of PZTs located in the same arm assembly as the actuation PZTs, avoids the complex electronics required to separate and multiplex the sensor signals and control signals in systems that simultaneously use a single pair of PZTs for both sensing and actuation.

Figure 5:
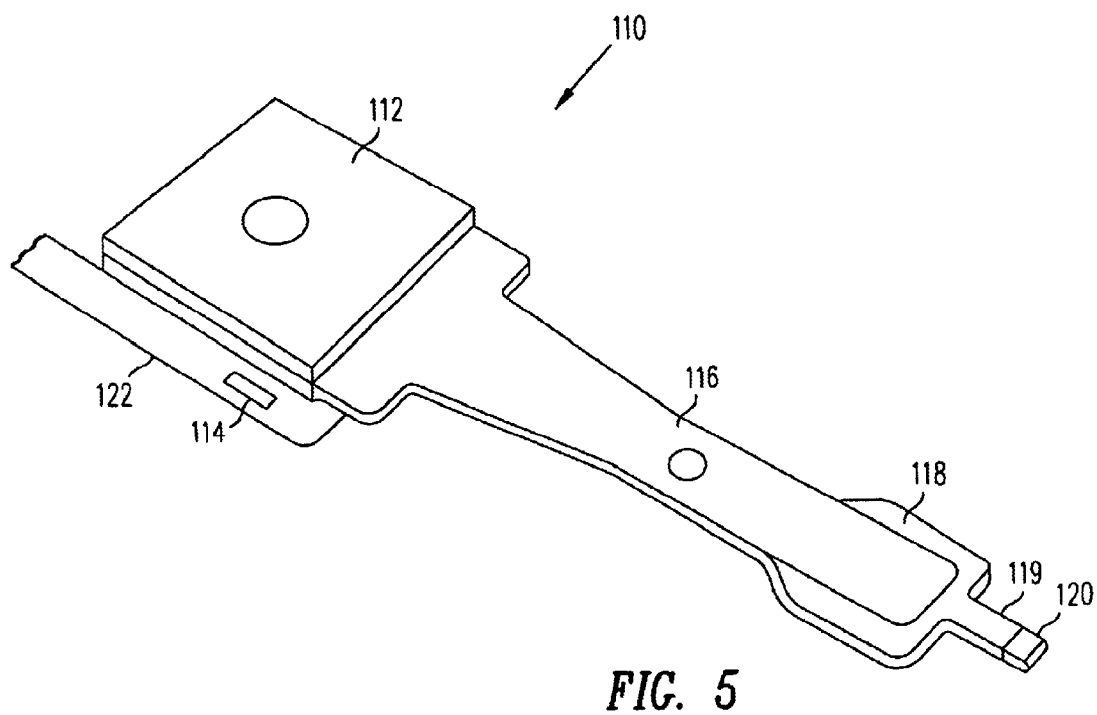
FIG. 5 illustrates a suspension including a milliactuator mounted on the flex circuit according to another embodiment of the present invention.

FIG. 5 illustrates a disk drive arm suspension 110 including a PZT 114 located at the end of the arm according to a further embodiment of the present invention. In one embodiment, suspension 100 is an "integrated lead suspension" (ILS) and comprises: mount plate 112, load beam 116, a flex circuit 122, PZT 114, flexure 118, slider 119 and read/write head 120. Flex circuit 122 provides the electrical leads from head 120 to the base of the suspension. PZT 114 is mounted at the tip of the arm on flex circuit 122. The flex circuit adhesive is bonded to the arm so that the PZT can sense the flexible vibration modes of the arm. In this embodiment the sensor is located very close to the primary control servo sensor (i.e., the read head) and thus has good observability.

Advantages of using PZTs mounted on or close to the suspension, such as at the end of the arm include: 1) for a disk drive head/arm assembly which may already be using such PZT's mounted between the arm and the head suspension flexure, no additional PZT or PZT wiring is needed; 2) it allows good observability of in-plane arm structural modes which are modes that can cause significant off track error; 3) placing a PZT element for use as a feedback sensor at other locations, for example on the VCM coil support arm, has the drawback that it is likely to sense other structural oscillation modes which may not be modes that cause head off track error. For example sensors placed on the coil support arm not only sense the Butterfly mode but also sense coil torsion and coil breathing modes.

Using a PZT sensor provides several advantages over using an accelerometer as a sensor. PZTs are generally less expensive and lighter weight than accelerometers. PZTs also generally produce a cleaner (less noisy) output signal, and sense and create output only for flexible structural vibration, whereas accelerometers also sense rigid body motion.

Figure 6:
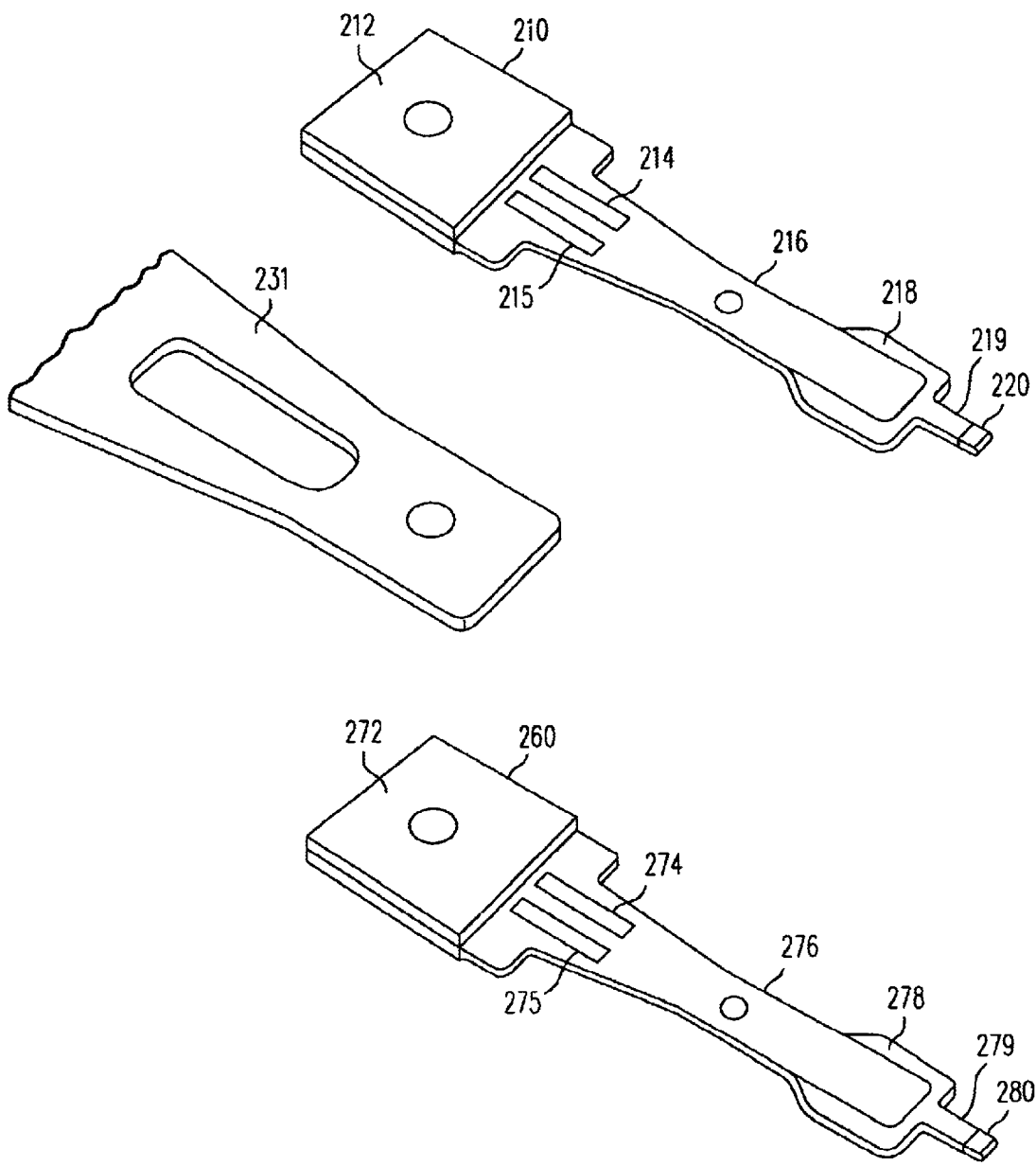
FIG. 6 illustrates an arm with two suspensions each having a milliactuator according to a further embodiment of the present invention.

FIG. 6 illustrates an arm with two suspensions each having a milliactuator according to a further embodiment of the present invention. Suspensions 210 and 260 are both coupled to arm 231. Suspensions 210, 260 each comprise: a mount plate 212, 272; a load beam 216, 276; secondary actuator (transducer) elements 214, 274 and 215, 275; a flexure 218, 278; a slider 219, 279; and a read/write head 220, 280. In this embodiment, the vibration sensing transducer pair and the actuation transducer pair can be on the same arm. Having the vibration sensor located on the same arm as the milliactuator that is being used to compensate for the arm vibration avoids the problem of having to determine the relative positions of the arms.

While the present invention has been described with reference to a few specific embodiments, the description is illustrative of the invention and is not to be construed as limiting the invention. Various modifications may occur to those skilled in the art without departing from the true spirit and scope of the invention as defined by the appended claims, including for example implementation of the present invention in different types of storage devices such as optical drives, removable media storage devices, etc.

What is claimed is:

1. An arm assembly for a storage device comprising:
   a first suspension to support a transducer head adjacent to a storage medium;
   a first milliactuator assembly coupled to the first suspension;
   a second suspension;
   a second milliactuator assembly coupled to the second suspension;
   wherein said first milliactuator assembly senses in-plane arm oscillation motion and outputs a signal, and wherein said second milliactuator compensates for the motion based on the signal.

2. The arm assembly of claim 1 wherein the first milliactuator assembly is comprised of a first piezoelectric element and a second piezoelectric element, and wherein the second milliactuator assembly is comprised of a third piezoelectric element and a fourth piezoelectric element.

3. The arm assembly of claim 2 wherein the first milliactuator is coupled to a first suspension and the second milliactuator is coupled to a second suspension and, wherein said first and second suspensions are coupled to a single arm.

4. The arm assembly of claim 1 wherein the first and second suspensions are each further comprised of a load beam and the milliactuator assemblies are coupled to the load beam.

5. The arm assembly of claim 1 wherein the first and second suspensions are each further comprised of a load eam and a flex circuit coupled to the load beam, wherein the first and second milliactuators are coupled to the flex circuits.

6. The arm assembly of claim 1 wherein the second milliactuator compensates for Butterfly mode motion.

7. A storage device comprising:
   a storage medium;
   an arm assembly having at least one arm, the at least one arm comprising;
   a first suspension, connected with an said at least one arm, to support a transducer head adjacent to a storage medium;
   a first milliactuator assembly coupled to the suspension;
   a second suspension connected with an said at least one arm;
   a second milliactuator assembly coupled to the suspension;
   wherein said first milliactuator assembly senses in-plane arm oscillation motion and outputs a signal, and wherein said second milliactuator assembly compensates for the motion based on the signal.

8. The storage device of claim 7 wherein the first milliactuator assembly senses the phase and amplitude of a dominant arm sway mode and wherein the controller generates a deceleration control signal with a phase relation so as to suppress an arm sway mode.

9. The storage device of claim 7 wherein milliactuator assemblies on opposite ends of said arm assembly determine a degree of arm assembly tilt during a seek operation.

10. The storage device of claim 7 wherein the second milliactuator assembly suppresses lower order arm sway frequencies during a deceleration trajectory of a target head.

11. The storage device of claim 7 wherein the controller filters out bending modes that are lightly coupled to track misregistration.

12. The storage device of claim 7 wherein the second suspension is further comprised of a load beam and the second milliactuator is coupled to the load beam.

13. The device of claim 7 wherein the first and second milliactuator assemblies further comprise a pair of piezoelectric elements.

14. The storage device of claim 7 wherein the milliactuator assembly is further comprised of a first PZT transducer and a second PZT transducer.

15. A method of controlling a milliactuator comprising:
   sensing in-plane arm oscillation motion of an arm with a first milliactuator coupled to a first suspension;
   outputting a sensor signal from the first milliactuator;
   processing the sensor signal to generate a control signal and compensating for the sensed motion using a second milliactuator connected with a second suspension, based on the control signal.

16. The storage device of claim 7 wherein frequency ranges of different arm oscillation modes are predetermined so as to identify oscillation modes from motion sensor output signals.

17. The storage device of claim 7 wherein the said first and second suspensions are coupled to a single arm.

18. The storage device of claim 7 wherein the arm assembly has at most two arms so as to eliminate certain oscillation modes.

19. The method of claim 15 wherein the sensing step further comprises sensing the phase and amplitude of a dominant arm sway mode and wherein the processing step further comprises generating a deceleration control signal with a phase relation so as to suppress an arm sway mode.

20. The method of claim 15 wherein the sensing step further comprises determining a degree of actuator assembly tilt during a seek operation based on output from a pair of milliactuators located at opposite ends of an actuator assembly.

21. The method of claim 15 wherein processing further comprises using predetermined frequency ranges of different arm oscillation modes so as to identify oscillation modes from motion sensor output signals.

22. The method of claim 15 wherein the compensating step further comprises compensating for Butterfly mode motion.

* * * * *